United States Patent [19]

Coutta

[11] 4,337,482

[45] Jun. 29, 1982

[54] SURVEILLANCE SYSTEM

[76] Inventor: John M. Coutta, 450 Superior Ave., Decatur, Ga. 30030

[21] Appl. No.: 261,609

[22] Filed: May 7, 1981

Related U.S. Application Data

[62] Division of Ser. No. 85,496, Oct. 17, 1979, abandoned.

[51] Int. Cl.³ .............................................. H04N 7/18

[52] U.S. Cl. .................................... 358/108; 358/210; 358/229

[58] Field of Search ............... 358/108, 125, 210, 206, 358/229

[56] References Cited

U.S. PATENT DOCUMENTS 3,935,380 1/1976 Coutta ................................ 358/108

4,027,329 5/1971 Coutta ................................ 358/108

4,067,015 1/1978 Mogauero et al. ................. 358/125

4,112,818 9/1978 Garehime, Jr. .................... 359/108

*Primary Examiner*—John C. Martin

*Assistant Examiner*—Edward L. Coles

*Attorney, Agent, or Firm*—C. A. Phillips

[57] ABSTRACT

A closed circuit TV surveillance system for business and other types of establishments in which a TV camera is movable along and suspended from a modified T-shaped rail assembly, which assembly is within a partially opaque housing. The view of the camera is selectively trainable by a movable mirror on any area of interest along the rail assembly, including, for example, stations at which there are electronic indicating cash registers. Digital data from the cash register observed is converted to video characters and mixed with the video output of the camera, and the combined video presentation is recorded.

7 Claims, 7 Drawing Figures

SURVEILLANCE SYSTEM

This is a division of now abandoned application Ser. No. 85,496 filed 10/17/79.

DESCRIPTION

Technical Field

This invention relates to surveillance systems, and particularly to a TV-type surveillance system particularly adapted to be employed in a retail store having a number of checkout stations, or in an industrial or public establishment having multiple discrete regions or continuous regions to be observed without notice.

Background Art

The business need of surveillance of retail and industrial sales establishments to prevent losses is well established. Thievery in such establishments is estimated to total at least $3 billion per year in the United States alone. This in turn results in greater costs of merchandise to everyone. In recognition of this problem, television cameras have been mounted at strategic locations within an establishment and have proved beneficial at reducing thievery. The difficulty with existing such systems is that they lack the versatility to effectively and economically monitor store operations. At this point, it is well to note the expanded need for surveillance which goes beyond shoplifting and includes monitoring of employees entering and leaving; employee performance and efficiency; thefts through rear doors of an establishment by employees, delivery people and others; and perhaps most urgently needed is surveillance of checkout operations to ascertain that proper amounts are registered for merchandise and in such a manner that the persons being viewed cannot detect that they are being viewed.

Further, it is the general object of this invention to provide a new and improved closed circuit television surveillance system.

Additionally, it is the object and purpose of this invention to further obscure back viewing of the camera of a surveillance system, and at the same time to simplify and reduce the cost of the system.

Disclosure of Invention

In accordance with this invention, a TV camera is mounted on a transporter, and the transporter is in turn supported by a modified T-shaped rail assembly extending over a selected path. The rail assembly is typically suspended from the ceiling of an establishment, typically being along a side of a series of stations and positions to be observed. A partially tinted or partially opaque cover surrounds at least a portion of the rail assembly, extending from end to end of the assembly. Since there is no light source within the cover and there is normal daylight or artificial light inside, the reflection of light on the cover, although only partially opaque, is substantial, and this essentially prevents back viewing.

As one feature of this invention, the transporter is moved in accordance with a programmed sequence. As a further feature of this invention, as the camera nears a discrete station, transactional events such as data from a cash register at that station would be simultaneously detected, and where in alpha-numeric form, would be converted into video signals of this character. Then, these video signals from the camera are mixed to provide both a picture and alpha-numeric data in a single video frame. The camera is mounted at an approximate angle of 45° with respect to the horizontal, and a mirror is positioned in front of the camera, and it is tiltable about two perpendicular axes to enable vertical and horizontal scanning through the partially opaque cover. By this optical combination, back viewing of the camera by persons being observed is made particularly more difficult.

DETAILED DESCRIPTION OF THE INVENTION

Figure 1:
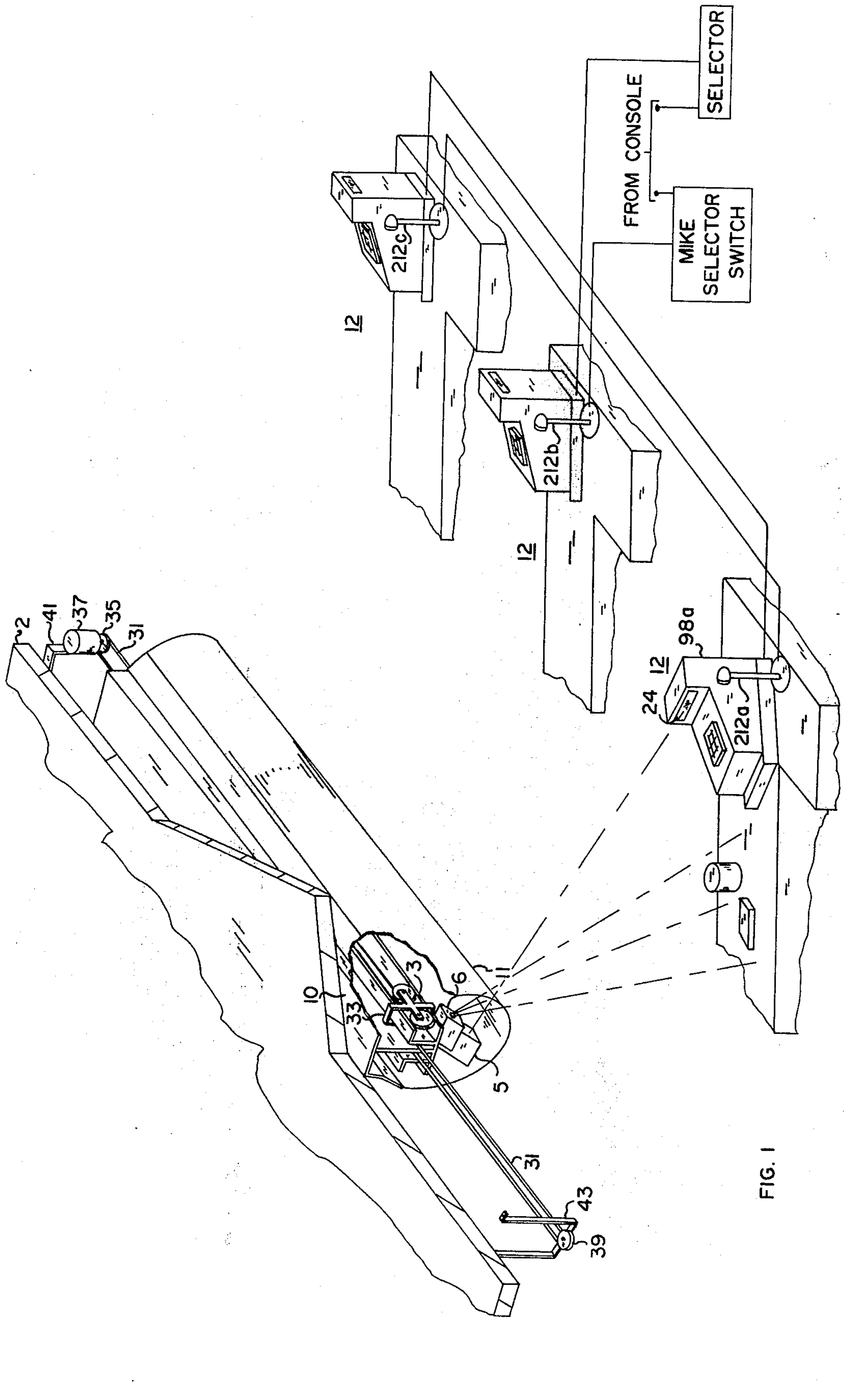
FIG. 1 is a pictorial view of a surveillance assembly and its use as contemplated by this invention.

Referring to the drawings, FIG. 1 shows an overall mechanical arrangement of an embodiment of the invention and illustrating its position with respect to cash register checkout stations 12 to be observed. It is adapted to generally observe the general area of a station, and in some instances, to separately view the readout, such as readout 24, of a cash register 98*a*. As an improved and simplified support, plate 1 of supporting rail 10 is attached (by means not shown) to a ceiling 2 and a camera dolly 3 constructed as more specifically illustrated in FIGS. 2 and 3 supported via a swivel mount 4, camera assembly 20 consisting of at least one camera 5. In some installations, in installations where there is no means of electronically obtaining cash register data except by a camera, a second camera 6 is supported, through camera 5, on camera dolly 3.

Figure 2:
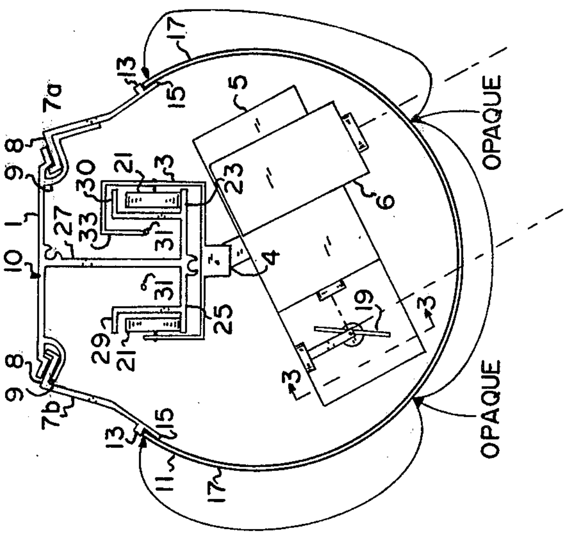
FIG. 2 is an end view of the surveillance assembly shown in FIG. 1.
Figure 4:
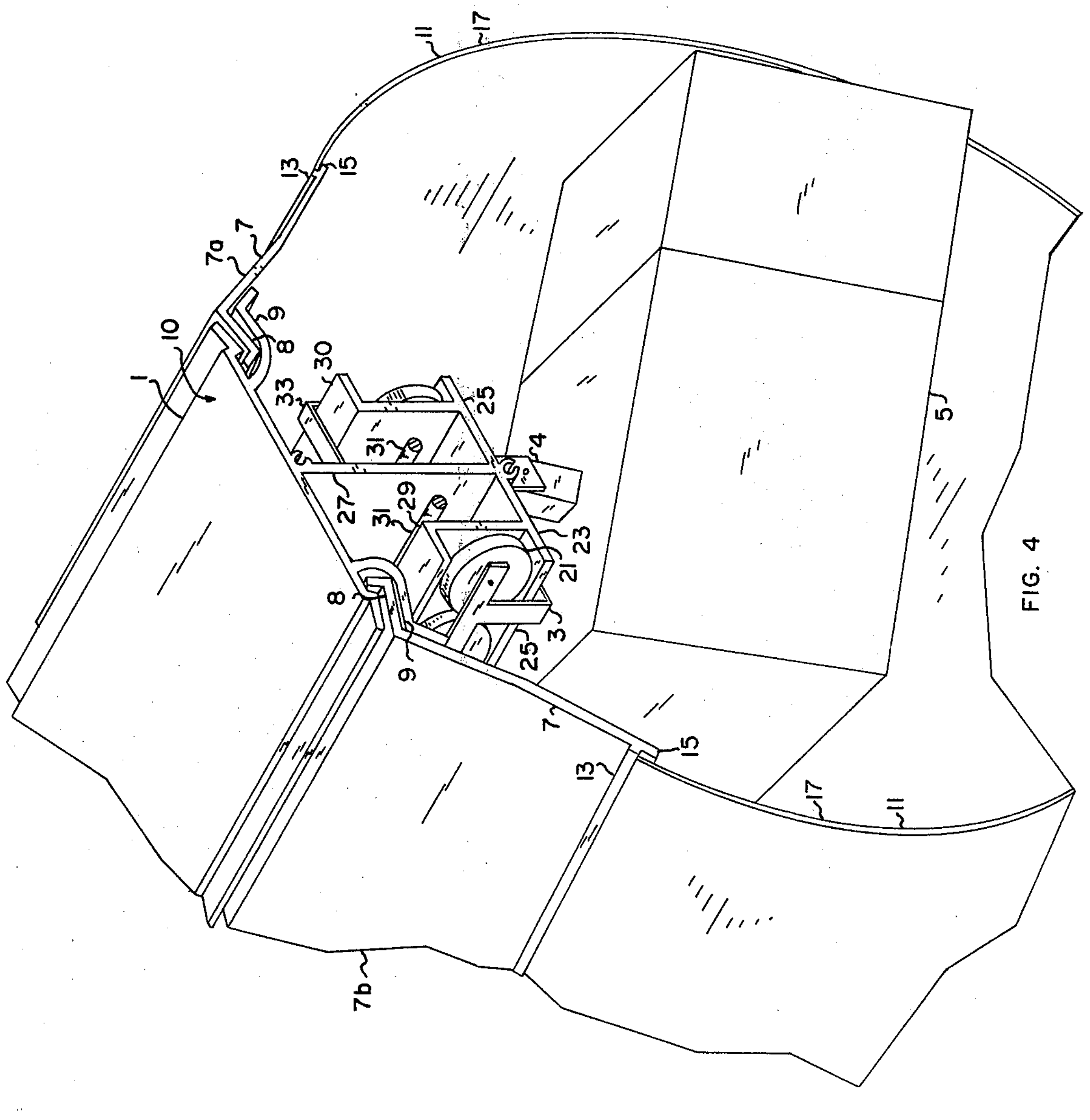
FIG. 4 is an enlarged perspective view of a portion of the surveillance assembly, and particularly illustrating a single camera system.

In addition, rail 10 is particularly configured, as best shown in FIGS. 2 and 4, to also support shroud or cover extensions *7a* and *7b*. Shroud extensions *7a* and *7b* are identical, and each are configured to include a locking catch 8 which interlocks with a locking groove 9 on opposite sides of upper plate 1 of rail 10, enabling rapid installation without fasteners of shroud extensions *7a* and *7b* on rail 10. Locking catch 8 is formed by an L-shaped end of extension 7, and locking groove 9 is generally of this configuration except that it is rounded to facilitate installation and locking. The lower edges of shroud extension *7a* and *7b* are adapted to receive, attach to, and hold a generally round cross section camera obscuring shroud or cover 11. Attachment is simply made by adhesive double-backed material and by rivets (not shown). To insure even attachment, an edge stop 13 is provided about ½ inch from lower edge 15 of shroud extensions *7a* and *7b*. Shroud or cover 11 is constructed of a material which generally passes 25% to 60% of incident light. Typically, it is tinted to a degree to effect the desired degrees of light transmission. It is made sufficiently dark to make it difficult for one to view the apparatus inside cover 11, basically cameras 5 and 6, and yet enable the cameras to adequately function. To further obscure observation, side 17 of cover 11 (as shown) is painted or otherwise made opaque, and in this manner the silhouette of the cameras will not be observable. As a further feature of this invention, which is applicable where only a single camera is necessary, the optical path through the front of a camera, camera 5, is made rather torturous by mirror 19, which adds to the discernability of view of the lens of the camera unless one is looking at precisely the correct angle. In this regard, single camera installations are becoming more and more possible by virtue of the increased availability of cash registers which have electrical readouts from which a digital output may be obtained which can be remotely displayed, making it unnecessary to employ a camera solely for viewing the readout of a cash register as illustrated by the use of camera 6 in FIG. 1 to view the digital readout of register 24. With direct electrical cash register signal readout, camera 6 would be omitted, and camera 5 would be employed to view the general scene around cash register 24 rather than as shown where camera 6 views this scene and camera 5 is employed to view the cash register readout.

Either a single camera 5 as shown in FIG. 4, or dual cameras 5 and 6 as shown in FIGS. 1 and 2, are supported by camera dolly 3 which employs two pairs of oppositely positioned wheels 21 which are supported on a frame 23 which attaches to swivel mount 4. Wheels 21 ride on bottom plate 25 of rail 10, and bottom plate 25 is attached by vertical web member 27 to top plate 1 of rail 10. The wheels are guided by vertical extending L-shaped or right angle guide plates 29 and 30. Dolly 3 is moved along rail 10 by virtue of its connection to drive cable 31 by means of bracket 33. Cable 31 is driven by pulley 35 attached to motor 37, and cable 31 is rotatably supported at an opposite end by pulley 39 as shown in FIG. 1. Motor 37 is supported by a fixed bracket 41 and pulley 39 by fixed bracket 43.

Figure 3:
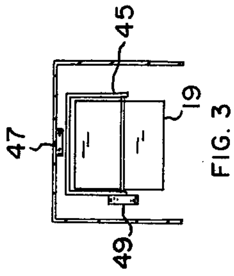
FIG. 3 is a sectional view along lines 3—3 of FIG. 2.
Figure 6:
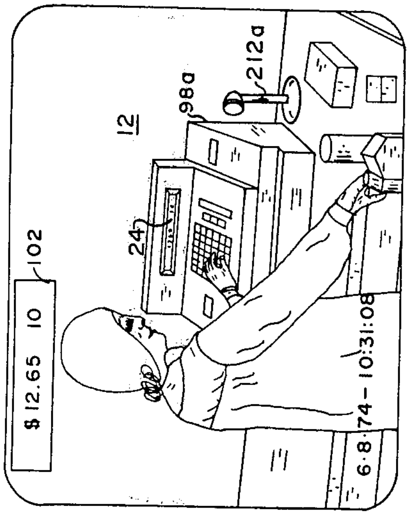
FIG. 6 is a partially pictorial illustration of the monitor display as contemplated by this invention.

Considering again a two-camera installation, camera 5 is made the adjustable one, and it is internally adapted to adjust for zoom or focal length adjustment by virtue of electrical input signals as shown derived from control console 83 in FIG. 6. Additionally, and as illustrated in FIGS. 2, 3, and 6, pan and tilt adjustments are effected by mirror 19, mirror 19 being mounted in a yoke 45. Yoke 45 is rotatable to effect pan adjustment by pan motor 47, and mirror 19 is adjustably tilted by tilt motor 49. By this arrangement, whereby adjustment of pan and tilt are effected by movement of a mirror rather than a whole camera, smaller motors may be employed for motors 47 and 49, and a more compact arrangement can be made within cover 11 and thus the cover size minimal. Further, pan and tilt can be effected with a much smaller and more obscure camera, and thus for this reason there is less likelihood of observance of the camera being panned or tilted to observe a particular person or transaction.

Figure 5:
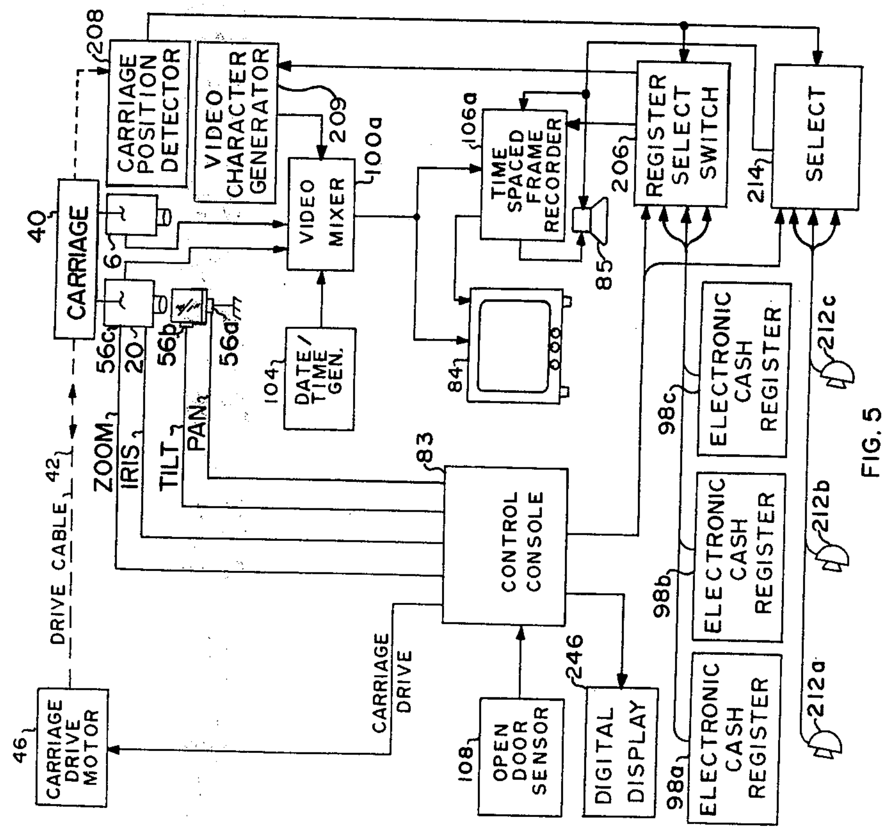
FIG. 5 is a schematic diagram of an overall arrangement of the system as contemplated by this invention.
Figure 7:
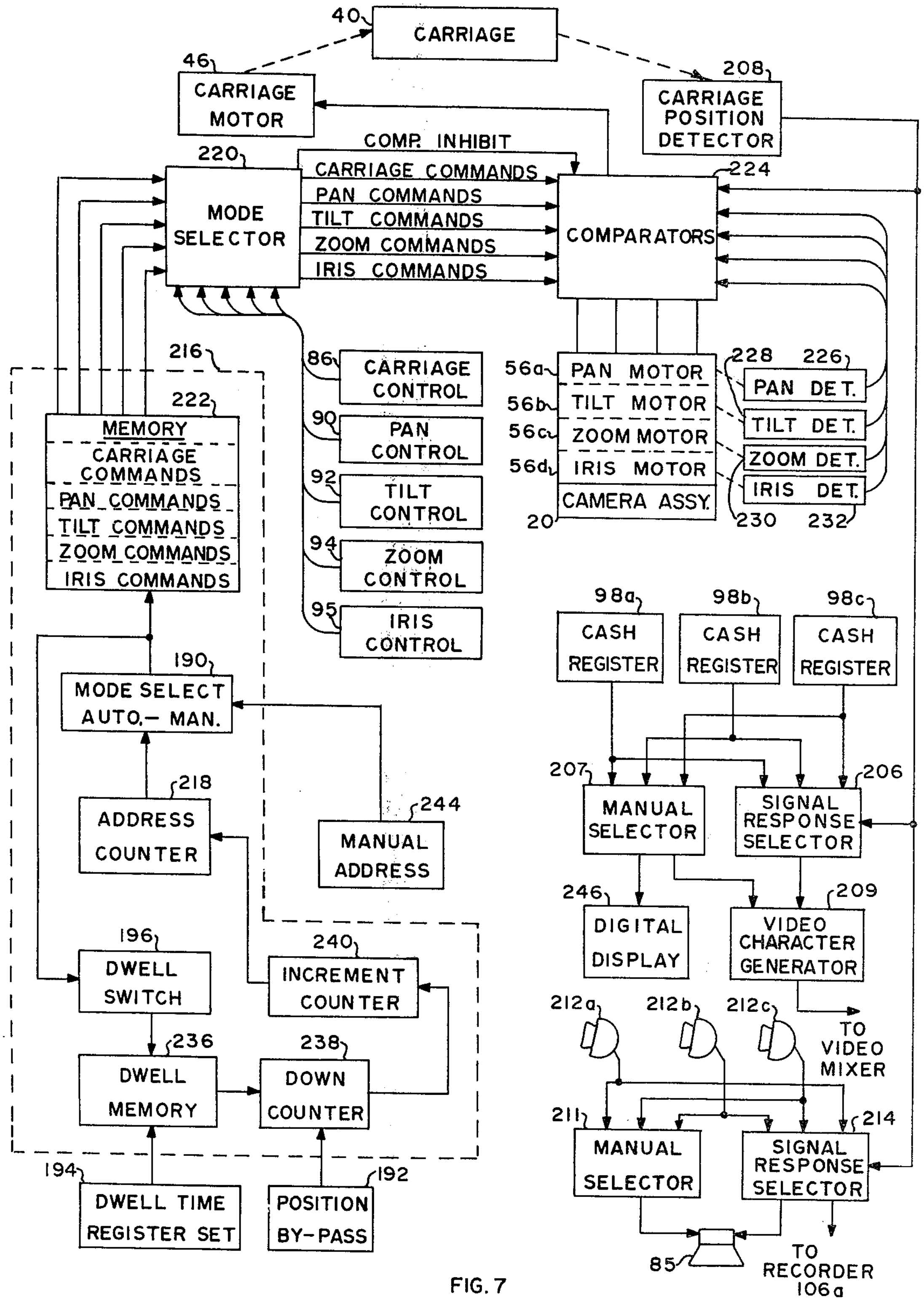
FIG. 7 is an electrical schematic illustration of a modified form of this invention in which certain automatic controls are effected.

A basic illustration of the system of the invention is shown in FIG. 5, and a more detailed illustration is shown in FIG. 7. The operating controls illustrated in FIG. 7 are housed in control console 83, shown in FIG. 5, and these controls would be operated by an operator who would view TV monitor 84 and control desired surveillance.

Pan control 90 reversibly controls motor 56*a* to manually cause mirror 19 to be trained to the left or to the right and thereby camera viewing. Manual tilt control 92 operates motor 56*b* to reversibly vary the tilt of mirror 19 and thus view camera 5. Manual zoom control 94 controls motor 56*c* to vary the focal length control of camera 20 to vary the magnitude of the area or field to be viewed, carriage control 86 positions carriage 40 at a desired position, and control 95 controls iris control motor 56*d* to control the iris opening for lens 60. Additionally, control 83 includes an automatic-manual mode selector 190, position by-pass control 192, dwell time set 194, dwell time switch 196, and certain other controls which are particularly illustrated in FIG. 7. Accordingly, the camera viewing angle is adjusted to view a particular field of view, e.g., a particular checkout station 12, as shown in FIG. 6, or cash register readout.

Open door sensor 108 (FIG. 5) is responsive to a door (typically a back door) being opened and provides a signal to control console 83 which automatically causes the pan and tilt signal to operate the mirror and controls to train the view of camera 5 on that door and to operate the zoom mechanism of camera 5 to adjust the focal length of camera 5 to a desired magnitude of field or view. This aspect of the system enables the observation, for example, of a rear door to keep track of merchandise being brought into or leaving an establishment.

Instead of using a separate camera to view and read out the digital outputs of cash registers at checkout stations, they are of the type in which computations are performed electronically and from which digital signals are generated, normally to effect a display 24 of a cash register 98*a* (FIG. 6). Thus, as shown in FIGS. 1, 5 and 7, these signals are taken from each of cash registers 89*a*, 89*b*, and 89*c* to register selector 206. This switch is operated from a switching output from carriage position detector 208 (which provides signals representative of carriage positions) to enable the display and recording of information from a cash register being viewed without the need for a separate camera to observe the visible display 24 on the cash register. Thus, the output from a particular cash register is fed to video character generator 209 which translates the digital signals to video signals and feeds them to video mixer 100*a*.

The output of camera 5 is conventionally combined in video mixer 100*a* (FIG. 5) with data from a cash register (98*a*, 98*b*, or 98*c*) or from camera 6 and from data-time generator 104, and the composite is fed to and displayed on monitor 84 (as shown in FIG. 6) wherein the cash register output is shown as display 102. Video recorder 106*a* is fed the same information as monitor 84 and may be operated continuously to accumulate information or to be selectively turned on to record selected presentations. In order to provide effective monitoring over relatively long periods of time which may be presented on monitor 84 in a shorter time, means are provided to operate recorder 106*a* intermittently to thus, for example, record single frames at some selected relatively slow rate, say, one frame per second. This, for example, thus enables playback of these same frames in a much shorter time, enabling, for example, the monitoring of 48 hours of actual surveillance in approximately one hour.

As a further modification of the system, microphones 212*a*, 212*b*, and 212*c* are employed adjacent to each cash register (as shown), and the microphone outputs are switched by signal responsive mike selector switch 214 to enable listening at console 83 on loudspeaker 85 of conversations at selected registers. As illustrated, signal responsive mike selector switch 214 is automatically switched from the signal from carriage position detector 208 (FIG. 7) to automatically observe a viewed register. When the output of a microphone is to be recorded, an audio output is supplied to recorder 106*a* from selector switch 214, and the recording speed would be increased, typically by a factor of 4, which would also increase the video frame rate of recording to four frames per second.

FIG. 5 particularly illustrates an automated version of the system of this invention wherein carriage and camera positions are operated in a pre-programmed sequence. Thus, an automatic sequence programmer 216 provides command signals for positioning carriage 40 and adjustment of camera 20. It employs an address counter 218 which typically would provide, chronologically, numeric outputs, one each for the different locales to be viewed. Thus, for example, if there were 10 such locales (while three are shown, as represented by three cash registers), it is, of course, to be understood that the number of such locales may vary. To illustrate operation of the automated system, it will be assumed that mode selector switch 190 is set in an automatic position and that address counter 218 has been operated on to provide a first digital output, a "1", through mode selector switch 190 to memory 222. This count corresponds to address 1 of the memory. There would be stored at this memory address a command signal for each of the functions involved, and upon the receipt of the interrogating address count, memory 222 would read out command signals for each function (carriage position, pan, tilt, zoom, and iris) to comparators 224 (one for each function). There would also be applied to comparators 224 actual position or adjustment state signals from carriage position detector 232. Like function signals would then be compared by the comparators and appropriate error output signals provided carriage motor 46, pen motor 56*a*, tilt motor 56*b*, zoom motor 56*c*, and iris motor 56*d*, whereby these motors drive the system elements to achieve a zero error and thus the commanded position, adjustment, or state.

At the same time that the address signal is supplied to memory 222, it is also supplied through on-off dwell switch 196 (when closed) to dwell memory 236 in which there is stored a dwell timing count for each address signal, representative of the dwell associated with each command stored in memory 222. Thus, with the count "1" to dwell memory 236, there would be stored a number indicative of the dwell time for the first carriage-camera state, and this number would be applied to down counter-timer 238 which would count down from this applied count to zero at a selected rate, say, for example, one count per 10 seconds. When the count reaches zero, an output is provided to increment counter control 240 which feeds an appropriate signal to address counter 218 to step it to the next address in sequence, causing the procedure just described to be repeated for a second address and second set of camera command stored in memory 222. This procedure would continue through a full count of 10 addresses, and then the procedure would start over. A memory location or register of memory 236 may also be set manually to any selected dwell time by dwell time set 194, in which case dwell switch 196 would be turned off. In order to permit by-passing a particular viewing position, position by-pass 192, connected to down counter 228 when operated, immediately resets down counter 238, causing it to provide an output to increment counter 240 to immediately reset address counter 218 and cause the system to proceed to the next control step. While there may be a new command for each parameter for each output of address counter 218, this is not necessarily the case. For example, with carriage 40 set at one position, the camera may be tilted or changed to view a second scene from the same carriage position, in which case memory command for a parameter which is not changed would simply be identical to the previous command for that parameter. In addition to memories 222 and 236 being interrogated from address counter 218, such may be effected manually by setting mode selector switch 190 to a manual mode and then providing a count from manual address control 244.

In instances where it is desired to record data from a cash register being viewed, and at the same time to observe at control console 83 amounts being rung up by another cash register, such may be effected by manual selector 207 which would then provide an output to a conventional digital display 246. Similarly, monitoring of a particular microphone may be effected by means of manual selector 211 which is connected between the microphones and loudspeaker 85.

From the foregoing, it will be appreciated that the present invention provides an improved system of surveillance of various types of establishments, particularly retail sales establishments, by a unique arrangement wherein a single rail member has readily interlocking means to support the cover assembly and also to mount a camera holding dolly, and the mechanical arrangement is substantially simplified and may be relatively inexpensive. By eliminating the panning and tilting of the whole camera and instead panning and tilting a mirror, it is possible to reduce the size of the camera installation, and thus reduce the size of the cover and, in fact, the whole installation. This not only makes the system less obtrusive, but also makes it significantly more inexpensive.

I claim:

1. A surveillance system comprising:

an elongated track positioned below a ceiling along a path under the ceiling, and including a carriage adapted to be supported by and be movably operated along said track;

electrically energized drive means for positioning said carriage along said track;

a television camera supported by said carriage below the ceiling;

a mirror supported by said carriage and positioned in front of said camera and electrically responsive mirror adjustment means for adjusting said mirror about two perpendicular axes, each being perpendicular to the axis of view of said camera, whereby the effective view seen by the camera may be varied horizontally and tilted;

a cover extending from end to end of said track and downward from, on both sides of, and under said track, and said cover being generally opaque along one side and being approximately 25% to 60% light transmissive over a portion of the balance of the cover through which camera viewing through said mirror is effected;

display means for displaying the output of said camera; and operating means comprising:

carriage control means for electrically and selectively operating said drive means for electrically positioning said camera along said track, and mirror control means for providing electrical signals to and selectively operating said mirror adjustment means.

2. A surveillance system as set forth in claim 1 wherein said elongated carriage track comprises:

a first elongated upper support plate adapted to be positioned horizontally and attached to a ceiling and running along said ceiling;

a second elongated plate which is coextensive with said first plate and splaced below said first plate;

a web plate interconnecting said first and second plates and lying in a plane longitudinally bisecting said first and second plates;

a pair of spaced elongated guide plates upwardly extending from said second plate and generally parallel with said web on either side of said web plate, and each having a turned-out top edge region; and said carriage includes a pair of rollers positioned to be retained by the combination of said lower plate and said guide plates to roll in a line along on said lower plate.

3. A surveillance system as set forth in claim 2 wherein said operating means includes means for selectively providing a plurality of discrete memory address signals, and said carriage control means includes carriage memory means responsive to a said discrete address signal for providing a location command signal to said drive means, whereby said carriage is positioned at selected positions.

4. A surveillance system as set forth in claim 3 wherein said camera control means includes camera memory means responsive to signals from said address means for providing selected mirror control signals to said mirror adjustment means for selectively varying the position of said mirror, whereby, upon the occurrence of a said memory address signal, said carriage is moved to a selected location, and said mirror is adjusted for that carriage location to view a particular scene.

5. A surveillance system as set forth in claim 4 wherein said address means includes means for sequentially providing a series of address signals to said memory means, whereby said carriage is moved from one selected location to another in a selected sequence, and at each carriage location a selected mirror adjustment is made for that location.

6. A surveillance system as set forth in claim 1 wherein said mirror adjustment means includes means for adjusting said mirror about a generally vertical axis and about a generally horizontal axis.

7. A surveillance system as set forth in claim 6 further comprising a second television camera, said second television camera being supported by said carriage and oriented to directly view through said 25% to 60% light transmissive portion of said cover, and said second television camera being adapted to a different size field of view than said first-named television camera.

* * * * *